United States Patent
Kirchner et al.

(10) Patent No.: US 9,168,842 B2
(45) Date of Patent: Oct. 27, 2015

(54) METHOD AND DEVICE FOR CONTROLLING THE AUTHORIZATION OF CHARGING OPERATIONS OF ELECTRICALLY OPERATED VEHICLES

(75) Inventors: Tobias Kirchner, Ludwigsburg (DE); Nico Bannow, Stuttgart (DE); Bernd Lutz, Horb (DE)

(73) Assignee: ROBERT BOSCH GMBH, Stuttgart (DE)

( * ) Notice: Subject to any disclaimer, the term of this patent is extended or adjusted under 35 U.S.C. 154(b) by 705 days.

(21) Appl. No.: 13/377,763

(22) PCT Filed: Oct. 8, 2010

(86) PCT No.: PCT/EP2010/065136
§ 371 (c)(1),
(2), (4) Date: Mar. 1, 2012

(87) PCT Pub. No.: WO2011/045249
PCT Pub. Date: Apr. 21, 2011

(65) Prior Publication Data
US 2012/0150360 A1 Jun. 14, 2012

(30) Foreign Application Priority Data

Oct. 16, 2009 (DE) .......................... 10 2009 045 756

(51) Int. Cl.
*G05D 3/12* (2006.01)
*B60L 11/18* (2006.01)

(52) U.S. Cl.
CPC ......... *B60L 11/1848* (2013.01); *B60L 11/1816* (2013.01); *B60L 11/1846* (2013.01);
(Continued)

(58) Field of Classification Search
USPC .................................. 700/286, 291, 295, 297
See application file for complete search history.

(56) References Cited

U.S. PATENT DOCUMENTS 6,081,205 A 6/2000 Williams

2007/0276671 A1* 11/2007 Gudigara et al. .......... 704/270.1
(Continued)

FOREIGN PATENT DOCUMENTS

| AU | 2008264146 | 7/2009 |
| CA | 2648972 | 6/2009 |

(Continued)

OTHER PUBLICATIONS

International Search Report, PCT International Application No. PCT/EP2010/065136, dated Oct. 17, 2011.

*Primary Examiner* — Darrin Dunn
(74) *Attorney, Agent, or Firm* — Kenyon & Kenyon LLP

(57) ABSTRACT

A method and a control unit for controlling the authorization of charging operations of electrically operated vehicles. A control unit is provided between a main terminal and a plurality of electric coupler sockets, which are connected to the control unit via a power line. A vehicle to be charged is connected to one of the electric coupler sockets, and the total charging current, which is conducted from the main terminal to the electric coupler sockets via the control unit, is measured. Charging-current requests are transmitted to the control unit by each of the vehicles connected to the electric coupler sockets, and the total charging current is compared to the sum of the charging currents reported by the vehicles connected to the charging outlets. The charging outlets are switched off if the total charging current exceeds the sum. The connecting of a vehicle to be charged includes transmitting authorization information from the vehicle to the control unit. The authorization information is compared to a list of authorized vehicles by the control unit, in order to check the authorization of the vehicle. The transmitting of charging-current requests and authorization information is provided by modulating an alternating current signal upon the power line, the alternating current signal representing the authorization request or the charging-current request.

14 Claims, 1 Drawing Sheet

(52) U.S. Cl.
CPC .......... *B60L2270/32* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2009/0307178 | A1* | 12/2009 | Kuhns et al. | 706/54 |
| 2010/0010683 | A1* | 1/2010 | Kates | 700/293 |
| 2010/0057970 | A1* | 3/2010 | Kashi et al. | 710/305 |
| 2010/0145535 | A1* | 6/2010 | Tyler et al. | 700/292 |
| 2010/0211340 | A1* | 8/2010 | Lowenthal et al. | 702/63 |
| 2010/0274570 | A1* | 10/2010 | Proefke et al. | 705/1.1 |
| 2010/0301809 | A1* | 12/2010 | Bhade et al. | 320/148 |

FOREIGN PATENT DOCUMENTS

| | | |
|---|---|---|
| CN | 1060596 | 4/1992 |
| CN | 101400542 | 4/2009 |
| CN | 101496254 | 7/2009 |
| EP | 2048762 | 4/2009 |
| JP | 56-25942 | 7/1954 |
| JP | 8-116626 | 5/1996 |
| JP | 11-122714 | 4/1999 |
| JP | 11-205909 | 7/1999 |
| JP | 2002-142463 | 5/2002 |
| JP | 2002-233082 | 8/2002 |
| JP | 2007-228695 | 9/2007 |
| JP | 2008-42984 | 2/2008 |
| JP | 2008-65635 | 3/2008 |
| JP | 2008-77267 | 4/2008 |
| JP | 2008-136291 | 6/2008 |
| JP | 2008-259254 | 10/2008 |
| JP | 2009-165301 | 7/2009 |
| JP | 2009-171700 | 7/2009 |
| JP | 2010-17006 | 1/2010 |
| WO | WO 2005/008808 | 1/2005 |
| WO | WO 2008/015893 | 7/2008 |
| WO | WO 2009059386 A2 * | 5/2009 |

\* cited by examiner

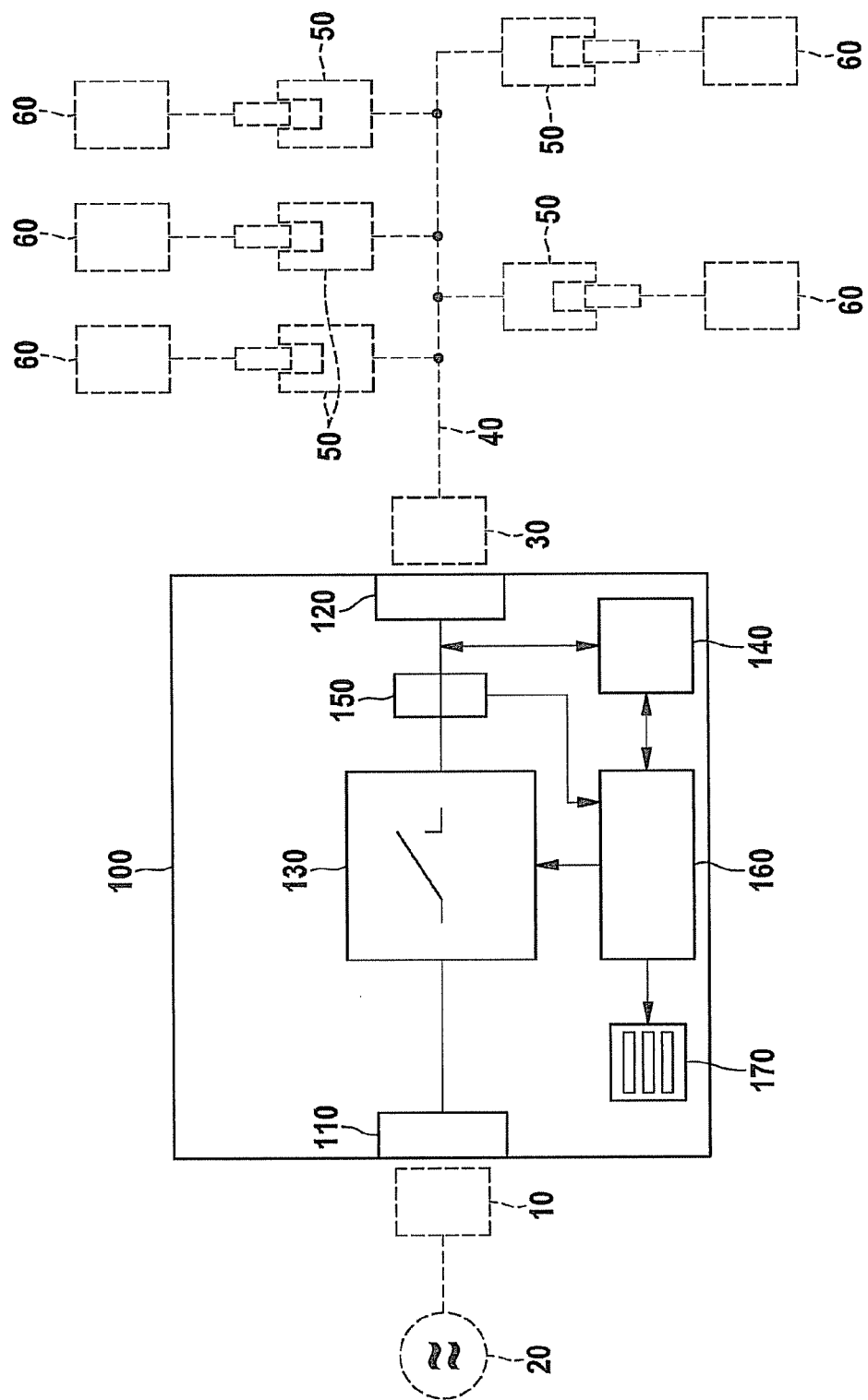

METHOD AND DEVICE FOR CONTROLLING THE AUTHORIZATION OF CHARGING OPERATIONS OF ELECTRICALLY OPERATED VEHICLES

FIELD OF THE INVENTION

The present invention relates to a method and a device for controlled charging of electrically operated vehicles and, in particular, a mechanism for blocking charging without authorization.

BACKGROUND INFORMATION

Electrically operated vehicles, i.e., hybrid vehicles and electric vehicles, are powered by electric storage batteries, which store traction energy for the vehicle. In order to supply the vehicle with new traction energy, there is the possibility of replacing an empty storage battery of the vehicle with a new one, but this is associated with a complicated replacement operation, and further problems occur during vehicle-related maintenance of the storage batteries.

In addition, electrically operated vehicles may be charged at an electric coupler socket of a customary system interconnection, but the electric coupler socket must be secured to protect against unauthorized withdrawals of power, e.g., by putting the electric coupler socket in a lockable chamber. However, this kind of access control is not practical in the case of mobile applications and is therefore associated with difficulties when constructing a charging power supply network.

The option of providing individual electric coupler sockets with individual switching modules for self-contained access control, which carry out authorization interrogations themselves, requires a high expenditure, since each electric coupler socket must be individually modified.

An object of the present invention is to provide a method and a device, by which controlled charging of electrically operated vehicles may be implemented without resulting in a high degree of installation and hardware expenditure.

SUMMARY

In accordance with the present invention, a central control unit is provided that controls a plurality of charging coupler sockets. In this manner, a plurality of charging coupler sockets may be controlled by a single control unit without requiring a modification of all of the charging coupler sockets. This allows a simple conversion of already-existing, electric coupler socket networks, e.g., in an underground garage, which are connected by a common line to a main terminal that is provided, for example, by a cutout box. Between this main terminal, i.e., between the cutout box, and the following electric coupler socket network, the control unit of the present invention is provided, which therefore controls the flow of current between the main terminal and all of the following, charging coupler sockets. In order to be able to individualize the vehicles, i.e., the load circuits, at the individual electric coupler sockets, data are transmitted via the already-existing, electric coupler socket network. Such transmission is used, for example, in carrier frequency systems, which are also referred to as powerline systems, and in which already-existing lines provided for supplying power are also used for data transmission. The data transmission is provided by modulating an alternating current signal upon the voltage in the power cable, the modulated alternating current signal having a markedly higher frequency than the alternating supply current of the power line, which means that using frequency separation, the data channel may be logically separated from the power supply. In principle, all standardized or non-standardized transmission techniques, which utilize a power line for data communication by modulation of an alternating current signal, may be used.

According to the present invention, the communication provided by the power line allows individual authorization control of the individual vehicles or load circuits to be provided; the authorization control being evaluated by the control unit, which, in the case of missing authorization, removes connected vehicles from the network. The interrogation of the individual load circuits at the individual electric coupler sockets may be provided via push or pull data communication traffic, that is, by a request on the part of the control unit, to which the vehicles respond (pull operation), or by an independent transmission by the vehicle of authorization data upon connecting (push operation).

In a simple manner, the present invention renders possible a determination of whether or not all of the vehicles connected to the power line are authorized to draw current. If at least one vehicle is determined to be unauthorized, the control unit may de-energize the entire power line and, therefore, all of the electric coupler sockets for at least a period of time, in order to deny access to unauthorized users in this manner. To this end, authorized vehicles transmit the requested charging current to the control unit via the above-described data transmission (using the power line). In this manner, the control unit has an overview of the sum of all requested or received charging currents. At the same time, the control unit may determine the power actually delivered to all of the charging coupler sockets, or the corresponding current, and compare the sum of the charging currents formed to the total charging current actually measured. If the actual, total charging current measured is greater than the sum of the transmitted amounts of charging current, then the control unit either switches off all of the electric coupler sockets or switches individual electric coupler sockets off or causes individual vehicles to interrupt the charging operation, in order to compare unauthorized vehicles to the sum of the charging-current amounts reported (and updated in accordance with the switching-off), in light of a new determination of the actual, total charging current. In this manner, an unauthorized vehicle may be detected by an individual, requested instance of switching-off.

According to an example embodiment of the present invention, the control unit therefore includes an interrupter for optionally switching off the electric coupler sockets, as well as a communication unit, by which the individual charging-current amounts or authorization information may be received from the vehicles or transmitted to them. For individual disconnection, the communication device is also equipped to transmit switching-off commands individually to the individual vehicles. The control unit of the present invention further includes a data-processing device, which is configured to add up the reported charging-current amounts, as well as a current-measuring unit, which measures the total charging current, in order to compare the sum of the reported amounts to the total charging current actually measured. The comparison result is sent to the data processing unit, which activates the interrupter accordingly or also sends individual interruption signals individually to the vehicles via the communication unit.

The present invention may be implemented by the following example methods, devices and their specific embodiments. Therefore, the example embodiments of the present invention include a method for controlling the authorization of charging operations of electrically operated vehicles provides a control unit between a main terminal and a plurality of charging coupler sockets, which are connected to the control unit via a power line. In particular, electric vehicles and hybrid vehicles are referred to as electrically operated vehicles. The main terminal may be provided by a cutout box and forms the root of the network, while the power line forms a stub line that connects the individual charging coupler sockets to the main terminal and therefore supplies them with power.

A vehicle to be charged up is connected to one of the charging coupler sockets, e.g., by connecting a charging terminal of a vehicle to the charging coupler socket via a charging cable. The total charging current, which is conducted from the main terminal to the charging coupler socket via the control unit, is measured. In particular, the total charging current that is transmitted through an interrupter unit of the control unit is determined. Since it may be assumed that the voltage in integrated power supply systems is generally the same, the terms current and power are to be regarded as equivalent descriptions of energy transmission. The total charging current may be measured, in particular, with the aid of a shunt resistor, i.e., using a voltage that decreases at a series resistor, or using magnetic field measurements, e.g., by Hall-effect sensors or induction coils, from which the current flow may be deduced.

Charging-current requests are transmitted to the control unit by each vehicle that is connected to the charging coupler sockets. Upon each connection of the vehicle to be charged to an electric coupler socket, a charging-current request preferably takes place in order to register a new vehicle with the control unit. In addition, charging-current requests are regularly transmitted to the control unit by vehicles already connected, in order to keep it updated. The charging-current requests may be demanded by the control unit (pull operation) or may be proactively transmitted to the control unit by the vehicle to be connected (push operation). The charging-current requests may be based on estimated charging-current values or setpoint charging-current values provided by a charging control unit of the vehicle, or may be measured charging-current values that a charging control unit of a vehicle measures.

In order to check the authorization of all connected vehicles, the total charging current (that is, the actual, measured, total charging current) is compared to the sum of charging currents, which are or were transmitted to the control unit by the vehicles that are connected to the electric coupler sockets. The charging currents of the vehicles are represented by the charging-current requests. Requests, which are transmitted by the vehicle to the control unit in order to communicate which charging current is presently demanded or requested by the individual vehicles, are to be regarded as charging-current requests. Thus, charging-current requests relate to charging currents that are received by the vehicle. Preferably, no charging-current request is initially required in order to supply a vehicle with charging current, but rather, each electric coupler socket provides the electric power; however, after it has begun to be provided, the authorization is requested and, if occasion arises, measures are taken.

Such a measure provides that the electric coupler sockets be switched off when the total charging current exceeds the sum. In particular, all of the electric coupler sockets are switched off. As an alternative, only individual electric coupler sockets are switched off; this requires, however, an additional switching module at each electric coupler socket. In addition, by transmission of control information by the control unit to the vehicle, the vehicle may adjust the charging operation, so that on the basis of the control command of the control unit, the drawing of electrical power from the electric coupler socket on the part of the vehicle is at least temporarily stopped. Such a temporary stoppage of the charging operation of the vehicle allows the identification of unauthorized vehicles, after it has been determined that at least one unauthorized vehicle is connected to the power line.

The connecting of a vehicle to be charged includes the transmission of authorization information by the vehicle to the control unit (either proactively or based on a request by the control unit). The authorization information is compared to a list of authorized vehicles by the control unit. This comparison also includes a comparison of the authorization information to stored proof of authorization, such as credit card numbers, cell phone numbers, charging subscription identifications, prepaid account identifications or other authorization or payment information. Since these pieces of proof are associated with the vehicle, e.g., via the driver of the vehicle, such proof of authorization is kept in the form of a list of authorized vehicles. Therefore, the entries of the list of authorized vehicles are not just direct designations of vehicles (for example, their license plate number), but also include pieces of proof that the driver of the vehicle or the drivers of the vehicle produce in the form of a general proof of authorization. The authorization of the vehicle is checked with the aid of the comparison (that is, in general, that the proof of authorization is checked to see whether or not it is correct). The transmission of charging-current requests (i.e., of the data regarding the charging current currently received) and the transmission of authorization information are provided via a wired transmission channel, which is provided by the power line, i.e., in particular, by modulating an alternating current signal upon the power line, the alternating current signal representing the authorization request or the charging-current request. The transmission may also be encoded or provided via a security protocol. If no secure connection can be formed with the vehicle, then it is assumed that the vehicle is not authorized, and the above-described measures are taken, which means that in this case, a switching-off step described here is implemented.

The step of transmitting authorization information is provided by transmitting a proof of authorization from the vehicle to the control unit, that is, proactively or in response to a request by the control unit. In addition, the step of transmitting is provided by transmitting a request for a proof of authorization from the control unit to the vehicle, this corresponding to pull operation. As a result, the vehicle transmits the proof of authorization on the basis of the control unit's request for the proof of authorization, this corresponding to a response within the pull operation.

The authorization information may include payment information, the control unit determining if the payment information may be booked. Thus, the authorization may be provided by transmitting payment information, such as a credit card number, whereby an authorization is issued when it is determined that the payment information may be booked. In this context, in particular, not only designations of the vehicles themselves, but also payment information associated with the vehicle via the owner or the driver of the vehicle, may be understood as a list of authorized vehicles. The vehicle is authorized through transmission of valid payment information. In general, the control unit preferably maintains a list, in which not only the requested or drawn charging currents are shown, but also identification markings of the vehicles that are assigned to each charging-current amount and are linked together with the charging-current amount in the list. The identification may be an actual serial number or may also be provided merely by numbering the connected vehicles consecutively, this numbering following, for example, from the order of initial connections. In particular, the identification of the vehicle includes simply an identification that is unique for all connected vehicles, but may be multivalued for the group of vehicles that are connected and that are not connected (but were connected in the past). In a particularly simple, specific embodiment, the identification marking, which is provided together with the associated charging-current value, may be specified by the position within a list in which the charging currents (i.e., their values) are represented. Consequently, the i-th charging-current entry corresponds to the vehicle having the identification marking i.

The charging-current requests are repeatedly or periodically transmitted by the vehicles to the control unit. These repeated or periodic requests are either proactively transmitted by the vehicle independently to the control unit within the scope of a push method, or are individually sent off repeatedly or periodically as a response to repeated or periodic requests of the control unit, this corresponding to a pull operation. This repeated or periodic transmission may be provided with a fixed time frame, this producing generally continuous monitoring. For example, the operation may be repeated every second or every minute or every quarter hour (or another predetermined period of time). In the same manner, the authorization information is also preferably requested repeatedly or periodically or transmitted by the vehicles to the control unit repeatedly or periodically, the authorization information being able to be transmitted using the same time pattern as the charging-current requests, preferably in a common message, or the authorization information being able to be transmitted by the vehicles to the control unit in a staggered manner or at a lower frequency. The transmission of the charging-current requests, the authorization information or the above-mentioned message by the vehicles to the control unit may be a proactive transmission in the scope of a push operation, or may be a reaction to a corresponding request by the control unit in the scope of a push operation. In particular, the authorization information is requested, when it has been determined that the total charging current is exceeding the sum, or when all of the electric coupler sockets, at least one electric coupler socket or only one electric coupler socket is switched off.

Switching-off mechanisms or interrogation mechanisms, which are provided when the total charging current exceeds the sum, are provided by the method as a mechanism for preventing unauthorized charging operations. In particular, these mechanisms are provided as follows. First of all, all of the electric coupler sockets may be switched off by the control unit for at least a predetermined period of time, when the total charging current exceeds the sum. The predetermined period of time may be a fixed period, e.g., a minute or five minutes. Alternatively, all of the electric coupler sockets may be switched off by the control unit and remain switched off, until the control unit is obstructed or receives an appropriate signal. When all of the electric coupler sockets are switched off for a predetermined period of time, then the above-described authorization interrogation and the transmission of charging-current requests are preferably carried out upon energization at the end of the predetermined period of time. Therefore, upon re-energization after the predetermined period of time, all of the measures are taken, which are executed upon connecting a vehicle to be charged to one of the electric coupler sockets. This relates to, in particular, the entire authorization interrogation and control, as well as to the transmission of the charging-current request.

According to a further specific embodiment, it is provided that the control unit terminate charging operations of vehicles individually. In this connection, the control unit transmits switching-off commands individually to the vehicles, the vehicles interrupting the charging operation upon receiving the switching-off commands. After each interruption or after each transmission of the switching-off command, the control unit carries out the step of comparing. During the comparison, the reported charging current of the vehicle switched off or to be switched off via the switching-off command is subtracted from the sum of all of the reported charging currents. Thus, the sum corrected in this manner corresponds to a setpoint value, which represents all of the reported charging currents. If the measured charging current exceeds this corrected sum, then it is assumed that an unauthorized vehicle intends to carry out a charging operation, or that the vehicle is not responding correctly to the switching-off command, and therefore loses authorization.

On the basis of the individual instances of switching off, the control unit, by comparing the total charging current to the sum of the reported charging currents (in particular, to the corrected sum), detects at least one vehicle that is receiving charging current from the electric coupler socket in spite of missing authorization or a received switching-off command. The control unit induces the outputting of a signal by this at least one vehicle, provided it reacts to this, in order to identify the unauthorized vehicle from the outside, via the outputting of the signal. Alternatively, the control unit switches off the electric coupler socket by transmitting an interruption signal to a switching module of the charging coupler socket; the at least one vehicle, which is receiving charging current from the electric coupler socket in spite of lacking authorization or in spite of receiving a switching-off command, being connected to this electric coupler socket.

According to a further specific embodiment, on the basis of the individual instances of switching off, the control unit, by comparing the total charging current to the sum of the signaled charging currents, detects at least one vehicle that is authorized to draw current. Using the individual instances of switching off and the associated comparison procedures, all vehicles, which are connected, have an authorization to charge, and react to the switching-off command by interrupting the charging process, are preferably detected. Using a signal-outputting command, these detected, authorized vehicles are induced by the control unit to output a signal. In this manner, all vehicles that have an authorization are identified from the outside via the outputting of a signal. In contrast to the above-described method in which only unauthorized vehicles are caused to output a signal, according to the specific embodiment described here, all of the other vehicles are identified in that all authorized vehicles output a signal that is apparent from the outside.

In particular, the activation of the turn-signal lamps, a driving light, or operating the horn for a short period of time, e.g., 5 seconds, is suitable as a signal output.

The present invention further provides a control unit having a main supply terminal, an output terminal, an interrupter unit, as well as a communication unit. The main supply terminal is configured to be connected to a central electricity supply system terminal, which may also be referred to as a main terminal. The output terminal is configured to relay the current of the main terminal and to be connected to a power line for controlled powering of a plurality of electric coupler sockets (that are connected to the power line). The interrupter unit is connected between the main supply terminal and the output terminal. A current-measuring unit of the control unit is connected to the main supply terminal, output terminal or between them, in order to measure the current flowing through the control unit. The communication unit is connected to the output terminal, in order to configure a further, logical channel for current conduction. To this end, the communication unit includes a demodulator and a modulator, in order to send and receive data via the output terminal and a power line connectable to it, using modulated signals. The control unit further includes a data processing unit, which implements various control mechanisms. This is connected to the communication unit, in order to store charging-current data of charging-current requests, which are transmitted to the communication unit, in a charging-current amount memory, via the communication unit and via the output terminal. In this manner, the data processing unit may store all of the individual charging currents as communicated by the connected vehicle. In addition, the data processing unit is configured to add up the charging-current data, e.g., with the aid of a summing unit, and, in this manner, to determine the sum of the charging currents of the vehicles, which are connected to the electric coupler sockets that are, in turn, connectable to the output terminal via the power line. Furthermore, e.g., with the aid of a comparator, the data processing unit is configured to compare this sum to the total current that is measured by the current-measuring unit. Therefore, this comparator, i.e., the data processing unit, provides a decision entity, which detects impermissible instances of drawing current and takes measures as a result of them. In particular, the interrupter unit is activated by the data processing unit as a measure, in that an interruption signal is transmitted when the data processing unit ascertains, via the comparison, that the sum of the reported instances of drawing current (i.e., the charging-current data and their charging current data) exceeds the total current delivered.

In addition, the data processing unit is configured to receive authorization information from the vehicles (or to request it from them), in order to evaluate it and to check the authorization. To this end, authorization information, which is transmitted by the vehicles via the power line that is connectable to the output terminal, is transmitted to the output terminal, and the data processing unit connected to the output terminal via the communication unit evaluates the received authorization information. To this end, the authorization information is verified by comparing it to a list of authorized vehicles. The list of authorized vehicles may not only be represented by a vehicle identification itself, but also by payment or subscription information that provides entitlement to draw current. In this connection, the list is stored in a memory of the control unit or of the data processing unit. As an alternative, the list may be kept in a remotely situated authorization interrogation system; in this case, the control unit further including a teletransmission interface, in order to transmit information and, in particular, the authorization information, via the teletransmission interface to an authorization interrogation system connectable to it. In particular, the teletransmission interface may be provided by an Internet connection, e.g., via a WLAN access point, or via a radio communications network-based Internet connection, such as via GPRS and WAP. In particular, the teletransmission interface may be provided for the above-described types of transmission, e.g., as a WLAN radio module or as a mobile radio network radio module, or as a power line module, as well, which is configured to connect the control unit to the Internet, via the main supply terminal, using a supply-network-based communications protocol.

According to a further specific embodiment of the present invention, the data processing unit, along with the communication unit connected to it, is configured to receive authorization information from the vehicle via the output terminal, in the form of a proof of authorization. In addition, the data processing unit is configured to compare the proof of authorization to the list and, consequently, to verify the proof of authorization. In principle, the proof of authorization may be proactively transmitted by the vehicle or transmitted after a request by the control unit. Therefore, the data processing unit is also configured to transmit authorization information via the output terminal to the vehicle, in the form of a request for a proof of authorization, or the data processing unit is configured to both transmit the request for a proof of authorization to the vehicle and receive the proof of authorization from the vehicle via the output terminal.

According to a further specific embodiment, the data processing unit, together with the connected communication unit, is configured to receive, via the output terminal, a payment information item inside the authorization information. In this connection, the data processing device does not process a proof of authorization itself, but regards a valid payment information item as equivalent to a proof of authorization. Therefore, the data processing unit, together with the teletransmission interface connected to it, is configured to transmit a remote interrogation to a remotely situated booking database, and is further configured to receive a bookability confirmation from the booking database via the teletransmission interface; upon reception, the bookability confirmation being regarded by the data processing unit as a verified proof of authorization, and as a result, the corresponding charging-current request being introduced into the sum of the charging currents. As an alternative, the booking database may be provided inside the control unit. Further possibilities include prepaid constructs, in which the authorization information is transmitted by the vehicle to the data processing unit in the form of an available amount of money (or a power equivalent); the data processing unit consequently evaluating the amount of money and storing the associated vehicle in a memory of the control unit as authorized, e.g., together with a maximum period of time.

The data processing unit, together with the communication unit connected to it, is further configured to transmit a charging-current amount request repeatedly or periodically to the vehicles, via the output terminal. In addition, the data processing unit, together with the communication unit, is configured to receive a corresponding charging-current amount response from the vehicles via the output terminal. Subsequently, the data processing unit is configured to update charging-current entries in the charging-current amount memory according to the charging-current amount response. The charging-current amount memory is provided in the control unit or as a part of the data processing unit as a read/write memory. This may be nonvolatile or volatile.

According to a further specific embodiment, the data processing unit is configured to transmit an interruption signal to the interrupter unit for a predetermined period of time, when the data processing unit ascertains that the sum exceeds the total current delivered. Furthermore, the data processing unit may be configured to individually transmit an interruption signal or a signal-output command, via the output terminal, to the vehicles or to switching modules of the electric coupler sockets, for a predetermined period of time or continuously. Using this interconnection of the data processing unit and the interrupter unit via the interruption signal, a blocking mechanism is provided that prevents the charging of unauthorized vehicles. In the same manner, using the interruption signal, a mechanism may be provided via the output terminal, the mechanism interrupting individual vehicles at least temporarily in their charging operation, in order to determine, by individual check, which of the vehicles does not react to the interruption signal and/or does not have an authorization to receive charging current. Alternatively, the electric coupler sockets may be provided with switching modules that convert the interruption signal; for this, with regard to the control unit, it is provided that the data processing unit be configured to control these electric coupler sockets via the output terminal as a data transmission interface. In order to provide the predetermined period of time, the control unit may include a timer that determines the period of time. In like manner, the control unit may include a timer that transmits the charging-current amount request to vehicles repeatedly or periodically.

BRIEF DESCRIPTION OF THE DRAWING

FIG. 1 shows a block diagram for explaining the present invention in greater detail, including a specific embodiment of the control unit according to the present invention.

DETAILED DESCRIPTION OF EXAMPLE EMBODIMENTS

FIG. 1 shows a control unit 100 of the present invention within a customary environment. The components displayed with the control unit of the present invention are represented by solid lines, the components of the customary application environment being represented by dashed lines. All of the three-digit reference numerals relate to components of the control unit according to the present invention, and all of the two-digit reference numerals relate to components of the environment, in which the control unit is used, and which do not belong to the present invention but are helpful for explaining the present invention in further detail. Control unit 100 includes a main supply terminal 110, as well as an output terminal 120 and an interrupter unit 130 connected between them. Finally, control unit 100 of the present invention includes a communication unit 140, which, for its part, is connected to output terminal 120 for modulating an alternating current signal. The connection between communication unit 140 and output terminal 120 is shown by arrows, which represent bidirectional data traffic, the connection only being configured for transferring data. Further connections that are only configured for transferring data are shown in FIG. 1, using arrows. The arrows indicate the direction of data transmission. Connections that don't have any arrows are connections for transmitting electric power.

The control unit further includes a current-measuring unit 150, which measures the current flow of output terminal 120 and transmits it in the form of a data signal to a data processing unit 160 of the control unit. Communication unit 140 further includes a demodulator and a modulator for transmitting data in both directions, neither the modulator nor the demodulator being shown in FIG. 1. Data processing unit 160 is further connected to a memory 170, in which, inter alia, charging-current data are stored that were received from output terminal 120 via communication unit 140 and were transmitted to data processing unit 160. The data processing unit further includes signal generators for generating corresponding data signals, a comparator, as well as a summing unit, which, however, are not shown in detail for the sake of simplicity. These components may be further provided by software, by which a programmable processor is controlled that implements these components together with the software. In the same manner, the associated software pieces represent implementations of the corresponding method steps.

Data processing unit 160 is further connected to interrupter unit 130 for controlling it, an interruption signal being transmitted by data processing unit 160 to interrupter unit 130, when it is detected that the total, actually delivered current measured by current-measuring unit 150 exceeds the sum of all of the charging-current data that are stored in memory 170.

Main supply terminal 110 is configured to be connected to a power supply system 20 via a cable connection terminal 10. According to the present invention, electric power of power supply system 20 is delivered through the control unit of the present invention to output terminal 120 of control unit 100. Output terminal 120 is further configured to be connected, via an electrical connection 30, to a power line 40 to which a plurality of electric coupler sockets 50 are connected. Electric coupler sockets 50 themselves may be connected to the vehicles, in particular, to charging control systems 60 of the vehicles, which, according to the present invention, use the current delivered by power line 40 for charging. In addition, charging control systems 60 are configured to transmit authorization information, as well as charging-current requests, through electric coupler sockets 50 to power line 40. Since output terminal 120 is configured to be connectable to power line 40, the signals transmitted by charging control systems 60 of the vehicles may be acquired inside of control unit 100 of the present invention, in that they are initially demodulated by communication unit 140 and, after demodulation, are transmitted via a data connection, through the data processing unit of control unit 100.

What is claimed is:

1. A method for controlling an authorization of charging operations of an electrically operated vehicle, comprising:
    providing a control unit between a main terminal and a plurality of electric coupler sockets which are connected to the control unit via a power line;
    connecting a vehicle to be charged to one of the electric coupler sockets;
    measuring a total charging current, which is conducted from the main terminal through the control unit to the electric coupler sockets;
    transmitting charging-current requests from each of the vehicles connected to the electric coupler sockets to the control unit;
    comparing the total charging current to a sum of charging-current data of charging-current requests from one or more of the vehicles that are connected to the electric coupler sockets; and
    switching off at least one of the electric coupler sockets when the total charging current exceeds the sum;
    wherein the connecting of the vehicle to be charged including includes transmitting authorization information from the vehicle to the control unit, and the authorization information being is compared by the control unit to a list of authorized vehicles, in order to check the authorization of the vehicle, and the transmitting of charging-current requests and of authorization information being is provided by modulating an alternating current signal upon transmitted through the power line, the alternating current signal representing one of the authorization request or the charging-current request,
    wherein when the total charging current exceeds the sum, the control unit individually transmits switching-off commands to the vehicles, the vehicles interrupt the charging operation upon receiving the switching-off commands, the control unit compares after each instance of interruption, a reported charging current of the vehicle switched off via the switching-off command being subtracted from the sum, and one of:
        (i) on the basis of the individual instances of switching off, the control unit, by comparing the total charging current to the sum of the reported charging currents, detects at least one vehicle that is receiving charging current from the electric coupler socket in spite of one of a lack of authorization or a received switching-off command, and the control unit one of induces an output of a signal of the at least one vehicle or switches off the electric coupler socket to which the at least one vehicle is connected, by transmitting an interruption signal to a switching module of the electric coupler socket, or (ii) on the basis of the individual instances of switching off, the control unit, by comparing the total charging current to the sum of the signaled charging currents, detects at least one vehicle that is authorized to draw current and interrupts a charging operation due to the received switching-off command, and the control unit induces an output of a signal of this vehicle.

2. The method as recited in claim 1, wherein the transmitting authorization information is provided at least one of by transmitting a proof of authorization from the vehicle to the control unit, and by transmitting a request for a proof of authorization from the control unit to the vehicle.

3. The method as recited in claim 1, wherein the authorization information includes payment information, the control unit checking if the payment information can be booked.

4. The method as recited in claim 1, wherein during the charging operation, the charging-current requests are transmitted by the vehicles to the control unit one of repeatedly or periodically, and represent an amount of charging current that is one of requested by the vehicle or is received by the vehicle via the electric coupler socket.

5. The method as recited in claim 1, wherein when the total charging current exceeds the sum, all of the electric coupler sockets are switched off by the control unit for at least a predetermined period of time.

6. The method as recited in claim 1, wherein the sum is calculated using charging-current data of charging-current requests from all authorized vehicles that are connected to the electric coupler sockets.

7. The method as recited in claim 1, wherein the sum is calculated using charging-current data of charging-current requests from all vehicles that are connected to the electric coupler sockets.

8. A control unit for controlling authorization of charging operations of an electrically operated vehicle, comprising:
a main supply terminal;
an output terminal;
an interrupter unit connected between the main supply terminal and the output terminal;
a communication unit connected to the output terminal and including a demodulator and a modulator to receive and send data from the output terminal as modulated signals;
a current-measuring unit to measure a total current delivered at the output terminal;
a data processing unit connected to the communication unit configured to store charging-current data in charging-current requests, which are transmitted by the modulated signals from the vehicles, in a charging-current amount memory of the control unit and to compare a sum of the charging-current data of charging-current requests to the total current delivered at the output terminal, the data processing unit being configured to open the interrupter unit when the sum exceeds the total current delivered, and the data processing unit further being configured to receive authorization information and to one of compare the authorization information to a list of authorized vehicles that is stored in a memory of the control unit, or send the authorization information via a teletransmission interface to a remotely situated, authorization interrogation system that keeps the list,
wherein:
the main supply terminal is configured to be connected to a main terminal, the interrupter unit is connected between the main supply terminal and the output terminal, and the output terminal is configured to be connected to a power line for controlled powering of a plurality of electric coupler sockets connected to the power line;
the communication unit uses the demodulator to receive modulated signals applied to the output terminal, and the modulator to send off data via the output terminal, in the form of modulated signals;
the data processing unit is configured to sum the charging-current data, the charging-current data to be summed by the data processing unit coming from different vehicles, which are connected to electric coupler sockets that are connectable to the output terminal; and
the data processing unit is connected to the interrupter unit and configured to output an interruption signal to the interrupter unit, when the data processing unit determines that the sum exceeds total current delivered; and the data processing unit being further configured to receive the authorization information via the teletransmission interface, and the data processing unit further being configured to close the interrupter unit when the data processing unit verifies authorization of the vehicle or receives proof of authorization from the remotely situated, authorization interrogation system.

9. The control unit as recited in claim 8, wherein the data processing unit, together with the communication unit, is at least one of
i) configured to receive authorization information from the vehicle via the output terminal in the form of a proof of authorization, and to compare this to the list, or
ii) configured to send authorization information to the vehicle via the output terminal, in the form of a request for a proof of authorization.

10. The control unit as recited in claim 8, wherein the data processing unit, together with the communication unit, is configured to receive, via the output terminal, a payment information item inside the authorization information, and the data processing unit, together with the teletransmission interface, is configured to transmit a remote interrogation to a remotely situated booking database, and to receive a bookability confirmation from the booking database via the teletransmission interface.

11. The control unit as recited in claim 8, wherein the data processing unit, together with the communication unit, is configured to transmit a charging-current amount request repeatedly or periodically to the vehicles via the output terminal, and to receive a corresponding charging-current amount response from the vehicles via the output terminal, and the data processing unit is further configured to update charging-current entries in the memory in accordance with the charging-current amount response.

12. The control unit as recited in claim 8, wherein the data processing unit is configured to transmit an interruption signal to the interrupter unit for a predetermined period of time, when the data processing unit ascertains that the sum exceeds the total current delivered, or the data processing unit is configured to individually transmit an interruption signal or a signal-output command, via the output terminal, to the vehicles or to switching modules of the electric coupler sockets, for a predetermined period of time or continuously.

13. The control unit as recited in claim 8, wherein the sum is calculated using charging-current data of charging-current requests from all authorized vehicles that are connected to the electric coupler sockets.

14. The control unit as recited in claim 8, wherein the sum is calculated using charging-current data of charging-current requests from all vehicles that are connected to the electric coupler sockets.

* * * * *